(12) United States Patent
Knopeck et al.

(10) Patent No.: US 6,955,769 B2
(45) Date of Patent: *Oct. 18, 2005

(54) COMPOSITIONS OF PENTAFLUOROPROPANE

(75) Inventors: Gary M. Knopeck, Lakeview, NY (US); Rajiv R. Singh, Getzville, NY (US); Ian Shankland, Randolph, NJ (US)

(73) Assignee: Honeywell International Inc., Morristown, NJ (US)

( * ) Notice: Subject to any disclaimer, the term of this patent is extended or adjusted under 35 U.S.C. 154(b) by 63 days.

This patent is subject to a terminal disclaimer.

(21) Appl. No.: 10/389,503

(22) Filed: Mar. 14, 2003

(65) Prior Publication Data

US 2003/0234380 A1 Dec. 25, 2003

Related U.S. Application Data

(60) Provisional application No. 60/363,978, filed on Mar. 14, 2002.

(51) Int. Cl.[7] .............................. C08J 9/14; C09K 5/04
(52) U.S. Cl. ........................... 252/67; 264/53; 570/126
(58) Field of Search ...................... 252/67, 68; 264/53; 570/126

(56) References Cited

U.S. PATENT DOCUMENTS

| | | | |
|---|---|---|---|
| 2,834,748 A | 5/1958 | Bailey et al. | 260/42 |
| 2,846,458 A | 8/1958 | Haluska | 260/448.2 |
| 2,917,480 A | 12/1959 | Bailey et al. | 260/42 |
| 6,100,229 A | 8/2000 | Swan et al. | 510/408 |

FOREIGN PATENT DOCUMENTS

| WO | WO 99/35209 | * 7/1999 |
|---|---|---|

OTHER PUBLICATIONS

Saunders and Frisch, "Polyurethanes Chemistry and Technology," Volumes I and II, (1962), John Wiley and Sons, New York, NY, pp. 193–200.

Prausnitz, Lichtenthaler and Arevedo, "Molecular Thermodynamics of Fluid–Phase Equilibria," Prentice–Hall, Inc. (second edition), pp 279–290.

Barton, "CRC Handbook of Solubility Parameters and Other Cohesion Parameters," CRC Press, Inc. (Fourth Printing), 1988, pp. 27–35.

Acree, Jr., "Thermodynamic Properties of Nonelectrolyte Solutions," Academic Press (1984) pp 90–97, 180–189.

* cited by examiner

Primary Examiner—John R. Hardee
(74) Attorney, Agent, or Firm—Deborah M Chess

(57) ABSTRACT

Provided are compositions comprising HFC-245fa and trans-1,2-dichloroethylene which exhibit relatively high solubility with conventional hydrocarbon lubricants, non-flammability, and relatively constant boiling points. Also provided are uses of such compositions.

6 Claims, 1 Drawing Sheet

Actual Boiling Points vs. Calculated ones from theory & data fitting

US 6,955,769 B2

COMPOSITIONS OF PENTAFLUOROPROPANE

CROSS-REFERENCE TO RELATED APPLICATION

This application claims the priority of the provisional application U.S. Ser. No. 60/363,978, which was filed with the United States Patent and Trademark Office on Mar. 14, 2002, and which is incorporated herein by reference.

FIELD OF INVENTION

The present invention relates generally to compositions of pentafluoropropane. More specifically, the present invention provides for compositions comprising pentafluoropropane and 1,2-dichloroethylene that have a relatively constant boiling point, and uses thereof.

BACKGROUND

Hydrofluorocarbon-based compositions are of interest for use as replacements for chlorofluorocarbon ("CFC") and/or hydrochlorofluorocarbon ("HCFC") compositions, which tend to be environmentally undesirable. In particular, applicants have recognized that compositions comprising mixtures of hydrofluorocarbon ("HFC") and non-HFC fluids are of interest for use in a wide range of applications, including for use as propellants in aerosol or other sprayable compositions. Unfortunately, applicants have further identified a number of disadvantages associated with adapting typical HFC/non-HFC mixtures for use in aerosols.

One disadvantage associated with the use of typical HFC/non-HFC mixtures in aerosols is that different HFC/non-HFC mixtures, including those which comprise the same components but differ, even slightly, in the relative concentrations thereof, tend to form sprayable products having vastly different properties. For example, an important property of aerosols and other pressurized, sprayable products is the nature of the spray itself. Sprays may be characterized, for example, as "mists" versus "streams" or as "dry" versus "wet". Although spray characteristics of an aerosol depend on several factors, one of the most important is pressure. It is well known in the art that changes in the pressure of an aerosol or other sprayable product can significantly alter spray properties. For example, higher pressures will generally yield more mist-like sprays while lower pressures will yield more stream-like sprays. The pressure of a typical aerosol is a function of the amount and type of propellant in the formulation and the amount and type of solvent or solvents in the formulation. The incorporation of a higher-boiling, hence lower-pressure, solvent into a formulation will tend to lower the pressure of the finished product while the incorporation of a lower-boiling, hence higher-pressure, solvent will tend to raise the pressure of the finished product.

Unfortunately, as is known in the art, HFC/non-HFC mixtures tend to undergo a significant change in boiling point for a relatively small change in the relative concentrations of the HFC/non-HFC constituents in the mixture. Consequently, slightly different HFC/non-HFC mixtures result in sprayable compositions having significantly different spray characteristics. Thus, even where one particular combination of two or more HFC/non-HFC solvents is deemed suitable for use in a given spray application, other combinations of the same two or more HFC/non-HFC solvents, which differ only slightly in the relative concentrations of the HFC/non-HFC solvents, may be unsuitable for the same application.

Applicants have come to appreciate that mixtures of two or more HFC and non-HFC solvents having relatively constant boiling points and vapor pressures—that is, boiling points and vapor pressures that change by a relatively small degree as the relative concentration of the mixture constituents changes—are desirable. In the manufacture of such mixtures, the relatively constant boiling point/vapor pressures would allow a wider range of compositions to be used for a given spray application. Unfortunately, HFC/non-HFC mixtures having such relatively constant boiling point and vapor pressure properties are not only uncommon, but also unpredictable.

DETAILED DESCRIPTION OF THE INVENTION AND PREFERRED EMBODIMENTS

Figure 1:
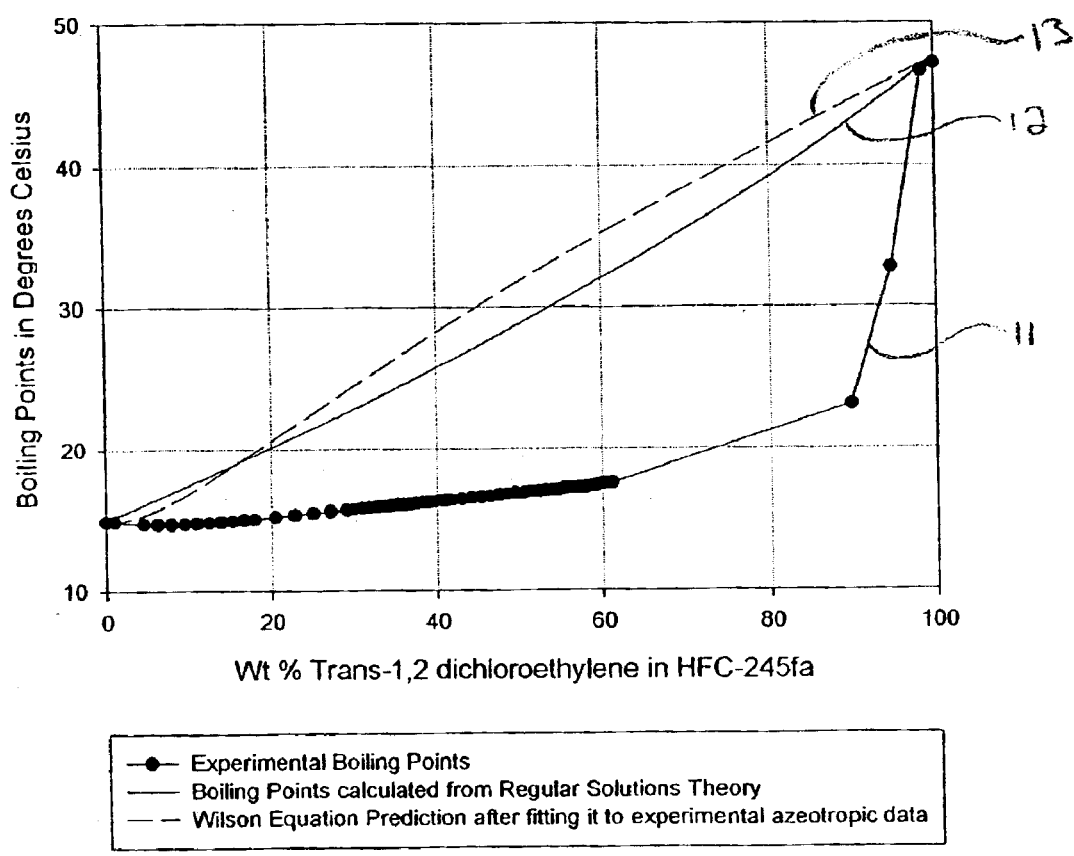
FIG. 1—shows a graphical depiction of actual and calculated boiling points of compositions of various weight percentages of trans-1,2 dichloroethylene in HFC-245fa.

The present invention overcomes the aforementioned shortcomings by providing for HFC compositions that exhibit relatively constant boiling point and vapor pressure characteristics. Specifically, the applicants have identified relatively-constant-boiling-point compositions comprising 1,1,1,3,3-pentafluoropropane ("HFC-245fa") and trans-1,2-dichloroethylene ("Trans").

As used herein, the term "relatively-constant-boiling-point composition" (or "RCPB composition" for short) refers to a composition comprising two or more constituents and having a boiling point which (1) lies between the highest and lowest boiling points of the individual constituents, and (2) changes less than one would expect for a given change in relative concentration of the constituents. With respect to the first boiling point characteristic, since the boiling point of the composition is between the highest and the lowest boiling point of its individual constituents, it is not an azeotrope. (It should be understood that a composition which is not an azeotrope may still be azeotrope-like.) As a non-azeotrope composition, the RCBP composition of the present invention, during boiling, undergoes a change in the relative concentration of the constituents as the more volatile components of the composition are vaporized. With respect to the second boiling point characteristic, while the boiling points of azeotrope compositions are, by their very nature, unpredictable, conventional wisdom suggests that the boiling point of a non-azeotropic composition can be predicted based on the boiling points of the constituent and their relative concentration in the composition. The applicants have discovered unexpectedly, however, that for a given change in the relative concentration of the constiutents, RCBP compositions exhibit a boiling point change less than would be expected using known predictive techniques.

For most conventional non-azeotropic compositions, those of skill in the art can calculate an expected change in boiling point by using one of a number of known techniques. Perhaps the most common approach is by using the Regular Solution Model (as illustrated in Prausnitz, Lichtenthaler, Azevedo "Molecular Thermodynamics of Fluid-Phase Equilibria", Prentice-Hall, Inc. (second edition), pp. 279–290 and Barton, "CRC Handbook of Solubility Parameters and Other Cohesion Parameters", CRC Press, Inc. (Fourth Printing 1988), pp. 27–35, both of which are incorporated herein by reference). Another common approach to predicting the expected boiling point curve for a range of compositions is by using the Wilson Model (illustrated in Acree, Jr., "Thermodynamic Properties of Nonelectrolyte Solutions", Academic Press (1984) 90–97, 180–189, which is incorporated by reference). For purposes of explanation and simplicity, any reference herein to "expected" boiling points, changes therein, or data therefor can be assumed to be calculated using the Regular Solution Model or the Wilson Model unless otherwise stated.

The Regular Solution Model is used conventionally to predict the boiling point curve for a "regular solution" composition as the relative concentration of the constituents (e.g. constituents A and B) change. By inputting characteristic data specific to the pure compositions of A and B, the Regular Solution Model equations provide a relatively quick method for predicting the expected boiling points for a composition having varying relative concentrations of constituents A and B—that is, the boiling points for the composition comprising from 100 wt. % A/0 wt. % B to 0 wt. % A/100 wt. % B. (All weight percents reported herein are based on total weight of the composition unless otherwise specified.) As is generally expected, the boiling point curve of a range of compositions that act as a regular solution tends to have a significantly positive slope, indicating that the compositions across that range will exhibit significant liquid compositional changes upon boiling or evaporation. Upon measuring experimentally and plotting the actual boiling curve for a composition having varying relative concentrations of constituents A and B, where the experimental data substantially corresponds to the predicted curve, the compositions are "regular solutions". However, where a composition exhibits an actual boiling point curve that deviates from the regular solution model via a less positive slope (a flatter slope or a slope closer to zero), the composition within that range will tend to exhibit relatively less significant, and often only minor, changes in boiling points as the relative concentration of the constituents changes. Such compositions comprise RCBP compositions according to the present invention.

The Wilson Model is a mathematical model used conventionally to predict the boiling points for a composition having varying relative concentrations of constituents A and B, that may or may not behave as a regular solution. The Wilson Model differs, at least in part, from the Regular Solution Model in that the Wilson Model allows the user to input not only the characteristic data of pure A and pure B components, but also any characteristic data already known or measured for mixtures of A and B. Thus, where a user is provided with, or is otherwise aware of, characteristic data associated with some of the mixtures of A and B having relative concentrations of constituents A and B between pure A and pure B, such data can be incorporated into the Wilson Model, along with the data associated with pure A and pure B, to afford an approximation of the boiling point for any composition having varying relative concentrations of constituents A and B. Because the Wilson Model allows for the incorporation of more known data than the Regular Solution Model, the curves predicted by Wilson tend to be more accurate than the Regular Solution Model. Accordingly, upon measuring experimentally and plotting the boiling points of the mixtures of A and B, those of skill in the art would expect the resulting graph to resemble, and have a slope similar to, a graph of the boiling points predicted by the Wilson Model. However, applicants have discovered that certain compositions exhibit an actual boiling point curve that deviates even from the Wilson Model by having a less positive slope (a flatter slope or a slope closer to zero) then would be expected. Such compositions comprise RCPB compositions for the purposes of the present invention.

Applicants have realized unexpectedly that mixtures of HFC-245fa and Trans form RCBP compositions. Specifically, applicants have determined that the experimentally measured boiling point curve for the compositions of the present invention has a slope which is unexpectedly and significantly flatter than the slope of the boiling point curves predicted using either the Regular Solution Model or the Wilson Model. Applicants calculated the predicted boiling point curves for the compositions of the present invention using the Regular Solution and Wilson Models as described above. With regard to the Wilson Model curve, applicants incorporated experimental data provided in U.S. Pat. No. 6,100,229 for azeotropic compositions comprising HFC-245fa and Trans (outside the presently claimed range of compositions) into the Wilson calculations in an attempt to provide a more accurately predicted boiling point curve.

BRIEF DESCRIPTION OF THE DRAWING

Referring to FIG. 1, a comparison of the plots of the predicted vs. measured boiling point curves illustrates the highly unexpected, yet useful relatively constant-boiling-point characteristics of the present compositions. Specifically, graph 10 depicts three boiling point curves, 11, 12, and 13, for the range of compositions comprising HFC-245fa and Trans (from 0 wt. % Trans/100 wt. % HFC-245fa to 100 wt. % Trans/0 wt. % HFC-245fa). Curve 11 is the actual boiling point curve measured experimentally by applicants, the data for which is listed in Table 1. Curve 12 is the boiling point curve predicted using the Regular Solution Model. Curve 13 is the boiling point curve predicted using the Wilson Model.

As shown in FIG. 1, the measured boiling point curve 11 is significantly flatter than either curve 12 or 13. According to certain embodiments, the slope of the boiling point curve for compositions of the present invention is approximately 1 degree per 10 wt. % of Trans, or less. Preferably, the slope is about 0.75 degree per 10 wt. % of Trans, or less, and even more preferably about 0.6 degree per 10 wt. % of Trans, or less.

Since the change in boiling point is unexpectedly low for varying relative concentrations of Trans, the boiling point across the ranges of compositions of the present invention is relatively constant. According to certain preferred embodiments, the compositions of the present invention have a boiling point of about 15° C. to about 20° C. at 14.7 psia. In certain other preferred embodiments, the compositions of the present invention have a boiling point of about 15° C. to about 19° C. at 14.7 psia, and in certain even more preferred embodiments, about 15° C. to about 18° C. at 14.7 psia.

Furthermore, despite the relatively higher amounts of flammable Trans present in the instant compositions, applicants have discovered unexpectedly that such compositions have relatively low flammability. Applicants have measured the flammability of the compositions of the present invention using a watchglass flammability test, wherein a given amount of composition is placed in a watch glass at room temperature and atmospheric pressure, and a flame is introduced above the glass, and discovered that compositions containing as much as 50 wt. % Trans or more are non-flammable. A similar test was conducted for compositions comprising both hydrofluorocarbons and flammable fluids such as alkanes, alcohols and ethers. Each of these compositions was found to be flammable at concentrations of 50 wt. % of the flammable component or less.

According to certain embodiments, the compositions of the present invention comprise from about 20 to about 75 weight percent of 1,1,1,3,3-pentafluoropropane and from about 25 to about 80 weight percent trans-1,2-dichloroethylene. In certain preferred embodiments, the compositions comprise from about 20 to about 70 weight percent of 1,1,1,3,3-pentafluoropropane and from about 30 to about 80 weight percent trans-1,2-dichloroethylene In more preferred embodiments, the compositions comprise from about 25 to about 65 weight percent of 1,1,1,3,3-pentafluoropropane and from about 35 to about 75 weight percent trans-1,2-dichloroethylene, and in even more preferred embodiments, from about 40 to about 60 weight percent of 1,1,1,3,3-pentafluoropropane and from about 40 to about 60 weight percent trans-1,2-dichloroethylene.

The components of the composition of the invention are known materials that are commercially available, for example, from Honeywell, or may be prepared by known methods. Preferably, the components are of sufficiently high purity so as to avoid the introduction of adverse influences upon cooling or heating properties, constant boiling properties, or blowing agent properties of the system.

Additional components may be added to tailor the properties of the compositions of the invention as needed. By way of example, oil solubility aids may be added in the case in which the compositions of the invention are used as refrigerants. Stabilizers and other materials may also be added to enhance the properties of the compositions of the invention.

Uses of the Compositions

The present compositions have utility in a wide range of applications. For example, one embodiment of the present invention relates to the use of the present compositions as propellants/solvents in sprayable compositions. In general, sprayable-type compositions comprise a material to be sprayed (herein "material") and a propellant/solvent or mixture of propellant solvents. For the sprayable compositions to be useful, it is necessary that the material be relatively or substantially soluble in the propellant/solvents to be used. While many HFCs alone, such as HFC-245fa, are poor solvents for many conventionally sprayable materials, applicants have recognized that the compositions of the present invention exhibit relatively high solubility with such materials, while also remaining non-flammable.

Any of a wide range of materials can be used in conjunction with the compositions of the present invention to produce the instant sprayable compositions. Examples of suitable materials include, without limitation, oils and other lubricants, release agents, cleaners, polishing agents, medicinal materials, such as, anti-asthma and anti-halitosis medicines, as well as, cosmetic materials, such as, deodorants, perfumes, hair sprays, and the like.

The sprayable compositions of the present invention may further comprise any of a wide range of inert ingredients, additional solvents, and other materials used conventionally in sprayable compositions.

In other embodiments, the compositions of the present invention are used as refrigerants in any of a wide variety of refrigeration systems. In certain preferred embodiments, the compositions of the present invention may be used in refrigeration systems containing a lubricant used conventionally with CFC-refrigerants, such as mineral oils, silicone oils, and the like. While HFC-containing refrigerants tend to be poorly soluble with conventional refrigeration lubricants, and therefore tend to be incompatible with such lubricants, applicants have recognized that the relative high solubility of the present compositions makes them suitable, and in some cases, ideal candidates for use with conventional lubricants. In addition, the relatively constant boiling nature of the compositions of the present invention makes them even more desirable for use as refrigerants in many applications.

In certain embodiments, the compositions of the present invention may be used to retrofit refrigeration systems containing CFC-refrigerants and conventional lubricants. Preferably, the present methods involve recharging a refrigerant system that contains a chlorine-containing refrigerant and a lubricant comprising the steps of (a) removing the chlorine-containing refrigerant from the refrigeration system while retaining a substantial portion of the lubricant in the system; and (b) introducing to the system a composition of the present invention. As used herein, the term "substantial portion" refers generally to a quantity of lubricant which is at least about 50% (by weight) of the quantity of lubricant contained in the refrigeration system prior to removal of the chlorine-containing refrigerant. Preferably, the substantial portion of lubricant in the system according to the present invention is a quantity of at least about 60% of the lubricant contained originally in the refrigeration system, and more preferably a quantity of at least about 70%. In certain highly preferred embodiments, the "substantial portion" comprises at least about 90%, and even more preferably at least about 95%, of the lubricant in the system. As used herein the term "refrigeration system" refers generally to any system or apparatus, or any part or portion of such a system or apparatus, which employs a refrigerant to provide cooling. Such refrigeration systems include, for example, air conditioners, electric refrigerators, chillers, transport refrigeration systems, commercial refrigeration systems and the like.

Those of skill in the art will recognize that the refrigeration systems used in the methods of the present invention generally comprise a chamber in which both a refrigerant and lubricant are contained and through which the refrigerant and lubricant can be circulated. According to certain embodiments of the present invention, the removal step (a) comprises removing a chlorine-containing refrigerant from a refrigeration system, especially from a chamber within the system, while leaving a substantial amount of lubricant, and preferably a hydrocarbon-based lubricant, in the system.

Any of a wide range of known methods can be used to remove chlorine-containing refrigerants from a refrigeration system while removing less than a major portion of the lubricant contained in the system. For example, because refrigerants are quite volatile relative to traditional hydrocarbon-based lubricants (the boiling point of refrigerants are generally under 10° C. whereas the boiling point of mineral oils are generally over 200° C.), the removal step may readily be performed by pumping chlorine-containing refrigerants in the gaseous state out of a refrigeration system containing liquid-state lubricants. Such gaseous-state removal can be achieved in any of a number of ways known in the art, including, the use of a refrigerant recovery system, such as the recovery system manufactured by Robinair of Ohio. Alternatively, a cooled, evacuated refrigerant container can be attached to the low pressure side of a refrigeration system such that the gaseous refrigerant is drawn into the evacuated container and removed. Moreover, a compressor may be attached to a refrigeration system to pump the refrigerant from the system to an evacuated container. In light of the above disclosure, those of ordinary skill in the art will be readily able to remove chlorine-containing lubricants from refrigeration systems and to provide a refrigeration system comprising a chamber having therein a hydrocarbon-based lubricant and substantially no chlorine-containing refrigerant according to the present invention.

Any of a wide range of methods for introducing the refrigerant composition to a refrigeration system comprising a hydrocarbon-based lubricant can used in the present invention. For example, one method comprises attaching a refrigerant container to the low-pressure side of a refrigeration system and turning on the refrigeration system compressor to pull the refrigerant into the system. In such embodiments, the refrigerant container may be placed on a scale such that the amount of refrigerant composition entering the system can monitored. Alternatively, a wide range of charging tools, known to those of skill in the art, are commercially available. Accordingly, in light of the above disclosure, those of skill in the art will be readily able to introduce non-chlorine compositions into refrigeration systems according to the present invention without undue experimentation.

In still other embodiments, the present invention provides foamable compositions, and preferably polyurethane and polyisocyanurate foam compositions, and methods of preparing foams. In such foam embodiments, one or more of the present compositions are included as a blowing agent in a foamable composition. The foamable composition preferably includes one or more additional components capable of reacting and foaming under the proper conditions to form a foam or cellular structure as is well known in the art. The preferred methods comprise providing such a foamable composition and reacting it under conditions effective to obtain a foam, preferably, a closed cell foam. The invention also relates to foam, and preferably closed cell foam, prepared from a polymer foam formulation containing a blowing agent comprising the composition of the invention.

Any of the methods well known in the art, such as those described in "Polyurethanes Chemistry and Technology," Volumes I and II, Saunders and Frisch, 1962, John Wiley and Sons, New York, N.Y., which is incorporated herein by reference, may be used or adapted for use in accordance with the foam embodiments of the present invention. In general, such preferred methods comprise preparing polyurethane or polyisocyanurate foams by combining an isocyanate, a polyol or mixture of polyols, a blowing agent or mixture of blowing agents comprising one or more of the present compositions, and other materials such as catalysts, surfactants, and optionally, flame retardants, colorants, or other additives. It is convenient in many applications to provide the components for polyurethane or polyisocyanurate foams in pre-blended formulations. Most typically, the foam formulation is pre-blended into two components. The isocyanate and optionally certain surfactants and blowing agents comprise the first component, commonly referred to as the "A" component. The polyol or polyol mixture, surfactant, catalysts, blowing agents, flame retardant, and other isocyanate reactive components comprise the second component, commonly referred to as the "B" component. Accordingly, polyurethane or polyisocyanurate foams are readily prepared by bringing together the A and B side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, and even other polyols can be added as a third stream to the mix head or reaction site. Most conveniently, however, they are all incorporated into one B-component as described above.

Dispersing agents, cell stabilizers, and surfactants may also be incorporated into the blowing agent mixture. Surfactants, better known as silicone oils, are added to serve as cell stabilizers. Some representative materials are available from, for example, Dow Corning, Goldschmidt, and Unicar Co., and are sold under the names of DC-193, B-8404, and L-5340 which are, generally, polysiloxane polyoxyalkylene block co-polymers such as those disclosed in U.S. Pat. Nos. 2,834,748, 2,917,480, and 2,846,458. Other optional additives for the blowing agent mixture may include flame retardants such as tri(2-chloroethyl) phosphate, tri(2-chloropropyl)phosphate, tri(2,3-dibromopropyl)-phosphate, tri(1,3-dichloropropyl) phosphate, diammonium phosphate, various halogenated aromatic compounds, antimony oxide, aluminum trihydrate, polyvinyl chloride, and the like.

Generally speaking, the amount of blowing agent present in the blended mixture is dictated by the desired foam densities of the final polyurethane or polyisocyanurate foams products. The proportions in parts by weight of the total blowing agent or blowing agent blend can fall within the range of from 1 to about 60 parts of blowing agent per 100 parts of polyol. Preferably from about 10 to about 35 parts by weight of the present composition per 100 parts by weight of polyol are used.

EXAMPLES

The present invention is more fully illustrated by the following, non-limiting examples.

Example 1

An ebulliometer consisting of a vacuum-jacketed tube having a condenser on top is charged with about 5 grams of HFC-245fa. The HFC-245fa is heated to boiling and the temperature is recorded. The HFC-245fa is allowed to cool and Trans is then added to the HFC-245fa in small, measured increments. After each addition of Trans, the mixture is allowed to come to a boil and the temperature is recorded as a function of the Trans added. Table 1 lists the boiling point results. As shown in table 1, the boiling point changed by no more than about 5° C. across the entire range of compositions of the present invention.

TABLE 1

Weight percent Trans (in HFC-245fa/Trans mixture) and boiling temperature of mixture

| WT. % | Temperature |
|---|---|
| 0 | 14.889676 |
| 0.94329 | 14.881015 |
| 4.544961 | 14.742235 |
| 6.249334 | 14.719656 |
| 7.893911 | 14.719916 |
| 9.481783 | 14.738167 |
| 11.015835 | 14.768633 |
| 12.498757 | 14.812071 |
| 13.933063 | 14.862888 |
| 15.321106 | 14.921515 |
| 16.665088 | 14.985946 |
| 17.967075 | 15.045058 |
| 20.452696 | 15.178842 |
| 22.792118 | 15.317639 |
| 24.997869 | 15.457501 |
| 27.081089 | 15.578486 |
| 29.051712 | 15.708737 |
| 29.997614 | 15.763231 |
| 30.918625 | 15.809104 |
| 31.815716 | 15.860299 |
| 32.689807 | 15.90205 |
| 33.541771 | 15.949203 |
| 34.372436 | 16.006166 |
| 35.182594 | 16.044503 |
| 35.972992 | 16.076855 |

TABLE 1-continued

Weight percent Trans (in HFC-245fa/Trans mixture) and boiling temperature of mixture

| WT. % | Temperature |
|---|---|
| 36.744347 | 16.115098 |
| 37.497337 | 16.163732 |
| 38.23261 | 16.197283 |
| 38.950786 | 16.241774 |
| 39.652453 | 16.283203 |
| 40.338174 | 16.321298 |
| 41.008487 | 16.349547 |
| 41.663905 | 16.373872 |
| 42.931998 | 16.435641 |
| 44.146134 | 16.51704 |
| 45.309684 | 16.576197 |
| 46.425745 | 16.646457 |
| 47.497166 | 16.720665 |
| 48.526573 | 16.792922 |
| 49.51639 | 16.839788 |
| 50.468857 | 16.868691 |
| 51.38605 | 16.940811 |
| 52.269892 | 16.985799 |
| 53.12217 | 17.032431 |
| 53.944545 | 17.069261 |
| 54.345006 | 17.085446 |
| 54.738564 | 17.108236 |
| 55.125394 | 17.144554 |
| 55.505668 | 17.178177 |
| 55.879551 | 17.223694 |
| 56.247203 | 17.223813 |
| 56.608779 | 17.232338 |
| 57.314293 | 17.271197 |
| 57.997232 | 17.303904 |
| 58.658661 | 17.364925 |
| 59.299583 | 17.414576 |
| 59.920935 | 17.494743 |
| 60.523601 | 17.55279 |
| 61.10841 | 17.571858 |
| 89.68 | 23.16 |
| 94.6 | 32.79 |
| 98.48 | 46.68 |
| 100 | 47.19 |

Example 2

In a previously described embodiment of this invention, the constant boiling compositions could be blended with other materials, such as lubricants, to form sprayable mixtures. Preferably, these would be aerosols. In formulating such sprayable mixtures it is often necessary or desirable that the material to be sprayed be miscible in the solvent/propellant. The miscibility of various lubricants in the compositions of this invention was evaluated as follows. A clear glass vial was filled with the solvent mixture to be tested and the weight of the mixture was determined. An amount of lubricant equal to 10% by weight of the mixture was added. The vial was sealed and shaken gently. The mixture was then observed. The presence of turbidity and/or of two distinct phases indicates that the lubricant is insoluble in the solvent. A single-phase, homogeneous system indicates miscibility. The test was carried out with pure HFC-245fa and with three different constant boiling compositions of HFC-245fa/Trans. These compositions contained, respectively, 13% by weight of Trans, 35% by weight of Trans and 50% by weight of Trans. The lubricants tested were mineral oil, Aldrich Silicone Oil, Sunisco 3GS (a refrigeration lubricant) and Oak 7B1 Process Oil. None of these materials are soluble in pure HFC-245fa. The composition containing 13% Trans will solubilize the mineral oil but none of the other lubricants. At 35% Trans the blend will solubilize the silicone oil and the Sunisco 3GS but not the Oak Process Oil, and at 50% Trans all of the tested lubricants are soluble. These data are summarized in Table 2.

TABLE 2

| Lubricant | HFC-245fa | HFC-245fa/ 13% Trans | HFC-245fa/ 35% Trans | HFC-245fa/ 50% Trans |
|---|---|---|---|---|
| Mineral Oil | Insoluble | Soluble | Soluble | Soluble |
| Sunisco 3Gs | Insoluble | Insoluble Two Phases | Soluble | Soluble |
| Oak-7B1 Process Oil | Insoluble | Insoluble Two Phases | Insoluble Turbid | Soluble |
| Aldrich Silicone Oil | Insoluble | Insoluble Two Phases | Soluble | Soluble |

What is claimed is:

1. A composition comprising from 25 to a 65 weight percent of 1,1,1,3,3-pentafluoropropane and from 35 to 75 weight percent trans-1,2-dichloroethylene.

2. The composition of claim 1 comprising from about 40 to about 60 weight percent of 1,1,1,3,3-pentafluoropropane and from about 40 to about 60 weight percent trans-1,2-dichloroethylene.

3. The composition of claim 2 having a boiling point of about 15° C. to about 180° C.

4. The composition of claim 1 consisting essentially of from 25 to 65 weight percent of 1,1,1,3,3-pentafluoropropane and from 35 to 75 weight percent trans-1,2-dichloroethylene.

5. A premix of a polyol and a blowing agent comprising a composition according to claim 1.

6. A closed cell foam composition prepared by foaming a foamable composition containing a composition according to claim 1.

* * * * *